(12) United States Patent
Konishi et al.

(10) Patent No.: US 12,182,702 B2
(45) Date of Patent: Dec. 31, 2024

(54) METHOD AND INFORMATION PROCESSING APPARATUS THAT PERFORM TRANSFER LEARNING WHILE SUPPRESSING OCCURRENCE OF CATASTROPHIC FORGETTING

(71) Applicants: KDDI Research, Inc., Fujimino (JP); THE BOARD OF TRUSTEES OF THE UNIVERSITY OF ILLINOIS, Urbana, IL (US)

(72) Inventors: Tatsuya Konishi, Fujimino (JP); Mori Kurokawa, Fujimino (JP); Bing Liu, Winnetka, IL (US); Gyuhak Kim, Chicago, IL (US); Zixuan Ke, Chicago, IL (US)

(73) Assignees: KDDI Research, Inc., Fujimino (JP); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 771 days.

(21) Appl. No.: 17/481,655

(22) Filed: Sep. 22, 2021

(65) Prior Publication Data
US 2023/0086727 A1 Mar. 23, 2023

(51) Int. Cl.
*G06N 3/08* (2023.01)
*G06F 18/21* (2023.01)
(Continued)

(52) U.S. Cl.
CPC ............. *G06N 3/08* (2013.01); *G06F 18/217* (2023.01); *G06F 18/23* (2023.01); *G06N 3/048* (2023.01)

(58) Field of Classification Search
CPC ........ G06N 3/08; G06N 3/048; G06F 18/217; G06F 18/23
See application file for complete search history.

(56) References Cited

U.S. PATENT DOCUMENTS

| | | | |
|---|---|---|---|
| 10,901,815 B2 * | 1/2021 | Chen | G06N 3/063 |
| 2007/0087756 A1 * | 4/2007 | Hoffberg | G06Q 10/06375 |
| | | | 455/450 |

(Continued)

OTHER PUBLICATIONS

Serrà, et al., "Overcoming Catastrophic Forgetting with Hard Attention to the Task", Proc. of ICML, 2018, 17 pages.

(Continued)

*Primary Examiner* — David E Choi
(74) *Attorney, Agent, or Firm* — Foley & Lardner LLP

(57) ABSTRACT

According to an aspect of the present disclosure, a method executed by an information processing apparatus in order to cause a neural network to learn a $T^{th}$ task corresponding to a $T^{th}$ learning set is provided. The method includes: for each of a plurality of units, determining an importance degree of the unit in the $T^{th}$ task; for each of a plurality of layers, determining dissimilar tasks from among a first task to a $(T-1)^{th}$ task, the dissimilar tasks being not similar to the $T^{th}$ task in terms of behaviors in the layer; and in learning that uses the $T^{th}$ learning set, suppressing updating of weight parameters of the plurality of units included in the plurality of layers in accordance with importance degrees in the dissimilar tasks determined for each of the plurality of layers.

15 Claims, 7 Drawing Sheets

(51) Int. Cl.
*G06F 18/23* (2023.01)
*G06N 3/048* (2023.01)

(56) References Cited

U.S. PATENT DOCUMENTS

| | | | |
|---|---|---|---|
| 2019/0043193 A1* | 2/2019 | Odaibo | G06F 18/285 |
| 2019/0130257 A1* | 5/2019 | Meyerson | G06N 3/045 |
| 2020/0089534 A1* | 3/2020 | Chen | G06N 5/01 |
| 2020/0089535 A1* | 3/2020 | Du | G06N 5/01 |
| 2020/0117519 A1* | 4/2020 | Chen | G06F 30/27 |
| 2021/0027162 A1* | 1/2021 | Yang | G06N 3/045 |
| 2021/0117869 A1* | 4/2021 | Plumbley | G06F 18/217 |
| 2021/0166385 A1* | 6/2021 | Shang | G06T 7/0012 |
| 2022/0179688 A1* | 6/2022 | Tamura | G06F 9/4881 |
| 2023/0177391 A1* | 6/2023 | Packwood | G06V 20/52 |
| | | | 706/12 |

OTHER PUBLICATIONS

Ke, et al., Continual Learning of a Mixed Sequence of Similar and Dissimilar Tasks, Proc. of NeurIPS, 2020, 12 pages.

* cited by examiner

METHOD AND INFORMATION PROCESSING APPARATUS THAT PERFORM TRANSFER LEARNING WHILE SUPPRESSING OCCURRENCE OF CATASTROPHIC FORGETTING

BACKGROUND OF THE INVENTION

Field of the Invention

The present disclosure relates to a deep learning technique, and more specifically to a technique to perform transfer learning while suppressing the occurrence of catastrophic forgetting.

Description of the Related Art

Various types of processing, such as image recognition, document categorization, behavior recognition, and behavior prediction, are performed using, for example, a neural network. A neural network is composed of a plurality of connected layers, and each layer includes one or more units. The units may be referred to as neurons. Input values of the neural network are input to each unit in the first layer. To each unit in the remaining layers, output values of one or more units in an immediately preceding layer are input as input values. Each unit includes a weight coefficient corresponding to each input value. Each unit multiplies each input value by the corresponding weight coefficient, and obtains an output value based on the sum of the values obtained through the multiplication by the weight coefficients. The weight coefficients that respectively correspond to the input values of each unit can be referred to as parameters. Each unit in layers other than the last layer outputs the output value thereof to one or more units in an immediately succeeding layer. Output values of the units in the last layer are used as the output values of the neural network.

For example, learning is performed in order to use a neural network in various tasks. Learning is processing for optimizing the parameters of each unit for a task using a set of learning data pieces (hereinafter referred to as a learning set) corresponding to the task. For example, for a task to recognize target objects A, B, and C from an image, a learning set that includes a large number of images of the target objects A, B, and C is prepared. Then, image data pieces of the images in the learning set are sequentially input to the neural network, and the output values of the neural network are obtained (forward propagation). An error in these output values is evaluated based on a predetermined error function, the error amounts of the units are obtained sequentially from the units in the last layer using a so-called error backpropagation method, and the "gradients" of respective parameters of the units are obtained from the error amounts of the units. Each parameter is changed/adjusted based on the corresponding gradient (backpropagation). By repeating forward propagation and subsequent backpropagation using the learning set, the parameters of each unit are optimized for the task.

In deep learning, a phenomenon called catastrophic forgetting is known. Take image recognition, for example; in a neural network that can distinguish among target objects A, B, and C based on a certain learning set, if learning is performed using another learning set that includes images of target objects D and E in order to further enable the target objects D and E to be recognized, the accuracy of distinction among the target objects A, B, and C may deteriorate, and this phenomenon is catastrophic forgetting.

A technique to suppress catastrophic forgetting (hereinafter, HAT technique) is disclosed in Joan Serrà and Didac Surís and Marius Miron and Alexandros Karatzoglou. Overcoming Catastrophic Forgetting with Hard Attention to the Task. In Proc. of ICML, 2018.

Also, a technique to facilitate transfer of knowledge among similar tasks by expanding the HAT technique (hereinafter, CAT technique) is disclosed in Zixuan Ke, Bing Liu, and Xingchang Huang. Continual Learning of a Mixed Sequence of Similar and Dissimilar Tasks. In Proc. of NeurIPS, 2020.

However, the calculation cost of the CAT technique is extremely high.

SUMMARY OF THE INVENTION

The present disclosure provides a technique to perform transfer learning while suppressing the occurrence of catastrophic forgetting at a low calculation cost.

According to an aspect of the present disclosure, a method executed by an information processing apparatus in order to cause a neural network to learn a $T^{th}$ task corresponding to a $T^{th}$ learning set is provided. Here, the neural network has learned, in sequence, a first task to a $(T-1)^{th}$ task that respectively correspond to a first learning set to a $(T-1)^{th}$ learning set by using the first learning set to the $(T-1)^{th}$ learning set, where T is an integer equal to or larger than 2. The neural network includes a plurality of layers that each include a plurality of units, and each of the plurality of units including a weight parameter corresponding to an input value to the unit. According to the aspect, the method includes: for each of the plurality of units included in the plurality of layers, determining an importance degree of the unit in the $T^{th}$ task; for each of the plurality of layers, determining dissimilar tasks from among the first task to the $(T-1)^{th}$ task, the dissimilar tasks being not similar to the $T^{th}$ task in terms of behaviors in the layer; and in learning that uses the $T^{th}$ learning set, suppressing updating of weight parameters of the plurality of units included in the plurality of layers in accordance with importance degrees in the dissimilar tasks that have been determined for each of the plurality of layers.

Further features of the present invention will become apparent from the following description of exemplary embodiments with reference to the attached drawings.

DESCRIPTION OF THE EMBODIMENTS

Figure 1:
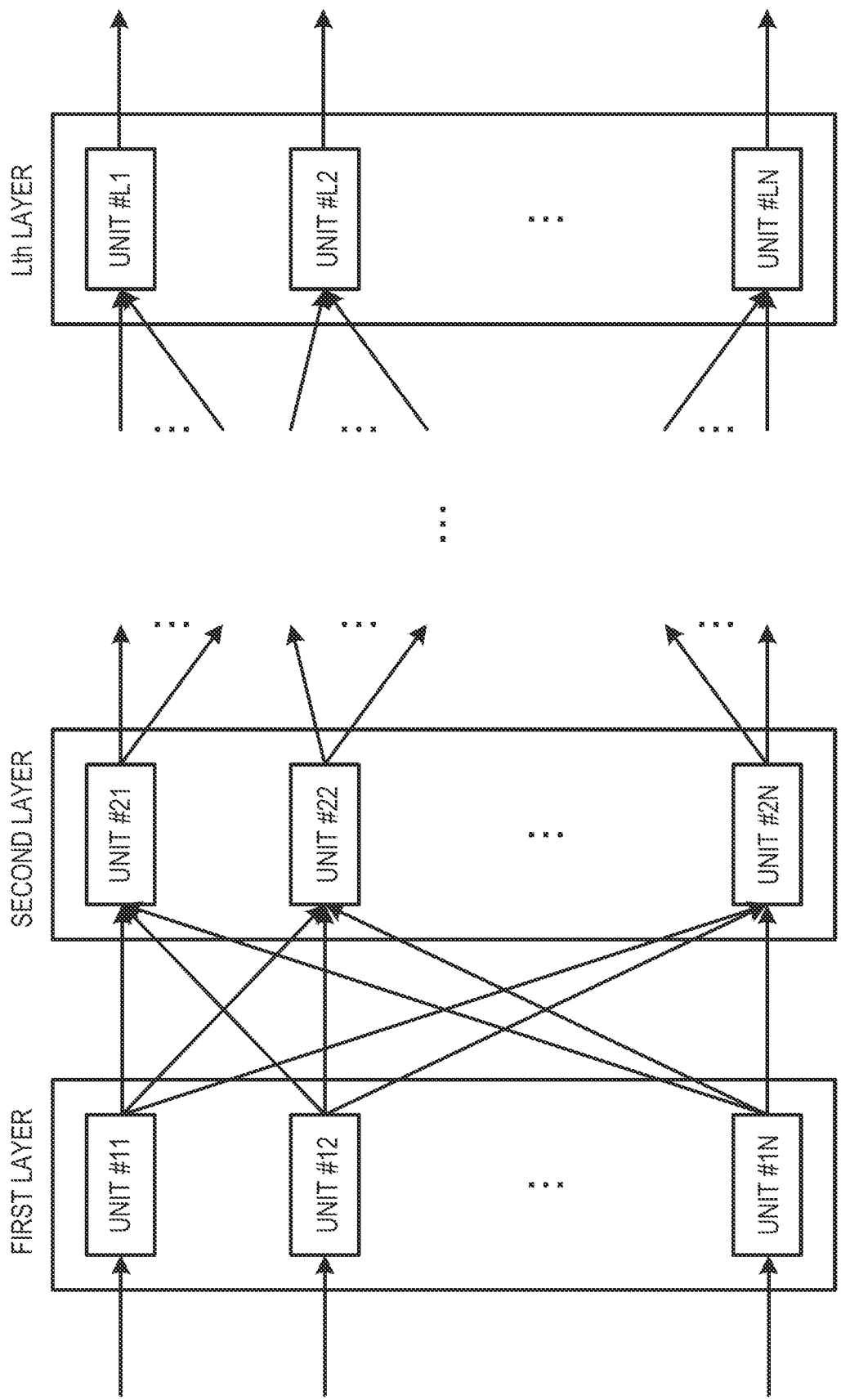
FIG. 1 is a configuration diagram of an exemplary neural network used in the description of the present disclosure.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a configuration diagram of a neural network used in the description of the present embodiment. The neural network includes a total of L layers, from the first layer to the $L^{th}$ layer (where L is an integer equal to or larger than 3). In the present embodiment, each layer includes N units (where N is an integer equal to or larger than 2). Below, the $n^{th}$ unit (where n is an integer from 1 to N) in the $1^{th}$ layer (where 1 is an integer from 1 to L) is referred to as a unit # ln. Input values of the neural network are input to respective units in the first layer. To each unit in the second layer to the $L^{th}$ layer, output values of all units in an immediately preceding layer are input. Output values of respective units in the $L^{th}$ layer are used as output values of the neural network. Note that the neural network of FIG. 1 is exemplary, and the configuration of the neural network is not limited to the one shown in FIG. 1. For example, the outputs of respective units in the first layer to the $(L-1)^{th}$ layer may be input to some of the units in the next layer. Also, respective layers may not include the same number of units.

The neural network of FIG. 1 has performed learning in the past using at least one learning set. In the following description, it is assumed that the neural network of FIG. 1 has performed learning using (T−1) learning sets (where T is an integer equal to or larger than 2). Identifiers "1", "2", . . . , "T−1" are respectively given to the learning sets in the order of use in learning. Note that each learning set is intended to cause the neural network to perform a certain predetermined task, and therefore each learning set corresponds to a task. Thus, in the following description, a task corresponding to a learning set with an identifier Y is referred to as a task Y, and the learning set with the identifier Y is referred to as a learning set of the task Y.

As a specific example which does not limit the invention, a task 1, for example, recognizes the target objects A1, A2, and A3 from images, and a task 2 recognizes target objects B1 and B2, which differ from the target objects A1, A2, and A3, from images. Similarly, subsequent tasks 3 to T−1 recognize predetermined target objects from images. Note that processing performed by the neural network is not limited to image recognition, and can be various types of processing, such as document categorization, behavior recognition, and behavior prediction.

Below, the present disclosure will be described using an exemplary case where learning of this neural network is performed using a learning set of a new task T. Note that the parameters of each unit in the neural network at the time of completion of learning based on the learning set of the task T−1, are referred to as initial parameters. That is to say, the initial parameters are the parameters of each unit in the neural network at the time of the start of learning based on the learning set of the task T.

Figure 2:
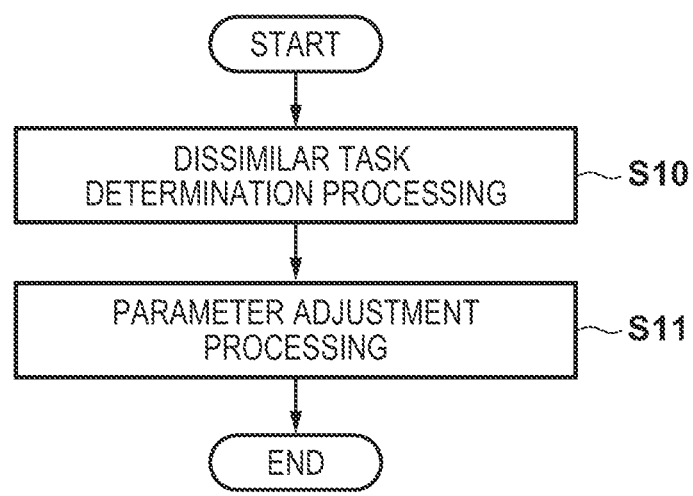
FIG. 2 is a flowchart of learning processing that is executed by an information processing apparatus.

FIG. 2 is a flowchart of processing that is executed by an information processing apparatus according to the present embodiment. In step S10, the information processing apparatus performs dissimilar task determination processing using the initial parameters of each unit and the learning set of the task T. In the dissimilar task determination processing, the parameters of each unit are changed from the initial parameters. However, as the initial parameters will be used in parameter adjustment processing in step S11, the information processing apparatus separately stores the initial parameter.

First, the dissimilar task determination processing performed in step S10 will be described. In the dissimilar task determination processing, similarly to normal learning, data pieces of the learning set of the task T are sequentially input to the neural network, and output values of the neural network are obtained (forward propagation). Then, the parameters of each unit are updated based on the output values of the neural network (backpropagation). Note that as each unit performs similar operations in forward propagation and backpropagation, the following describes the operations of the unit # ln.

Figure 3:
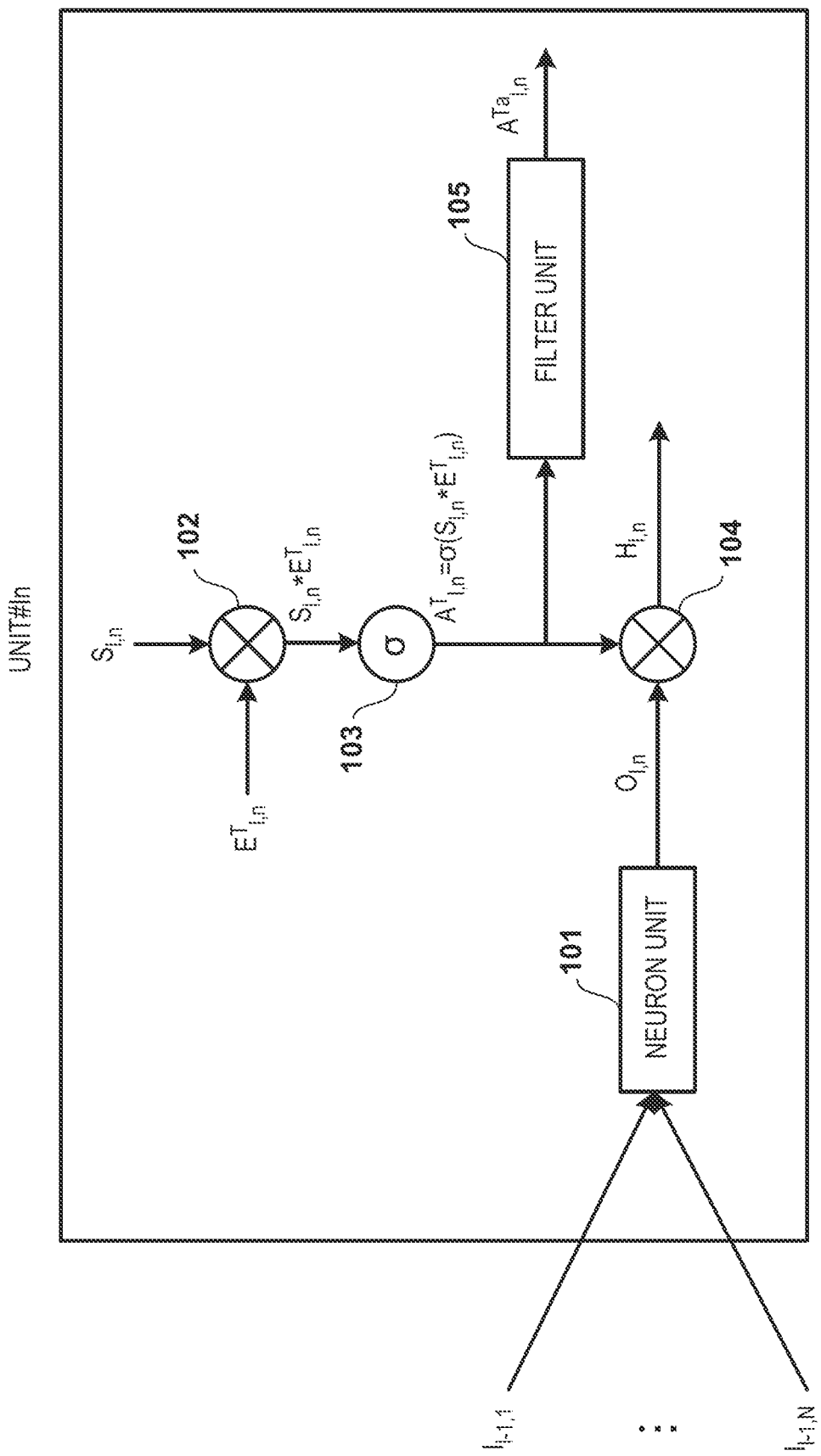
FIG. 3 is a functional block diagram of units in dissimilar task determination processing at the time of forward propagation.

FIG. 3 is a functional block diagram for describing the operations of the unit # ln at the time of forward propagation. The unit #(1-1)1 to the unit #(1-1)N in the $(1-1)^{th}$ layer input the input values $I_{1-1,1}$ to $I_{1-1,N}$ to a neuron unit 101. The neuron unit 101 includes weight coefficients that respectively correspond to the input values $I_{1-1,1}$ to $I_{1-1,N}$ as weight parameters, and outputs an intermediate value $O_{1,n}$ based on the input values $I_{1-1,1}$ to $I_{1-1,N}$ and the weight parameters. In the case of normal learning processing, this intermediate value $O_{1,n}$ is used as the output value of the unit # ln.

On the other hand, in the present embodiment, the unit # ln includes a feature parameter $E^T_{1,n}$. The feature parameter $E^T_{1,n}$ is used to determine a degree of similarity in layer behaviors among tasks, which will be described later. Note that T denotes the $T^{th}$ task. The feature parameter $E^T_{1,n}$ is updated similarly to the weight parameters included in the neuron unit 101 at the time of backpropagation, which will be described later; thus, an arbitrary appropriate value is set as the initial value of the feature parameter $E^T_{1,n}$. Also, the unit # ln includes a constant $S_{1,n}$. A multiplication unit 102 outputs the value $S_{1,n}E^T_{1,n}$ obtained as the product of the feature parameter $E^T_{1,n}$ and the constant $S_{1,n}$ to a gate unit 103. The gate unit 103 converts the input value using a predetermined function, thereby outputting an importance degree parameter $A^T_{1,n}$. In the present embodiment, the predetermined function is a sigmoid function, and thus $A^T_{1,n} = \sigma(S_{1,n} * E^T_{1,n})$.

Here, when the value $S_{1,n}$ is sufficiently large, the importance degree parameter $A^T_{1,n}$ has a value close to 1, or a value close to 0, depending on whether the feature parameter $E^T_{1,n}$ is positive or negative. A multiplication unit 104 outputs the value of the product of the intermediate value $O_{1,n}$ from the neuron unit 101 and the importance degree parameter $A^T_{1,n}$, as the output value $H_{1,n}$ of the unit # ln, to the unit #(1+1)1 to the unit #(1+1)N. As stated earlier, the output value $H_{1,n} \approx$ the intermediate value $O_{1,n}$ when the importance degree parameter $A^T_{1,n}$ is close to 1, whereas the output value $H_{1,n} \approx 0$ when the importance degree parameter $A^T_{1,n}$ is close to 0. That is to say, the output value of the unit # ln is substantially the same as the output value in normal learning processing (the intermediate value $O_{1,n}$ in the present example) when the importance degree parameter $A^T_{1,n}$ is close to 1, whereas the output value of the unit # ln is substantially 0 when the importance degree parameter $A^T_{1,n}$ is close to 0. As such, the importance degree parameter $A^T_{1,n}$ also serves as a parameter that controls whether to output the output value in normal learning processing (the intermediate value $O_{1,n}$ in the present example) as the output value of the unit # ln, or to block the output value of the unit # ln.

A filter unit 105 holds importance degree parameters $A^1_{1,n}$ to $A^{(T-1)}_{1,n}$ that respectively correspond to the task 1 to the task T−1. Note that the importance degree parameters $A^1_{1,n}$ to $A^{(T-1)}_{1,n}$ that are held by the filter unit 105 respectively have values at the time of completion of learning of the task 1 to the task T−1 (at the time of completion of the parameter adjustment processing in step S11 of FIG. 2). Below, the values of the importance degree parameters at the time of completion of learning based on respective learning sets will be referred to as importance degree evaluation values. Therefore, the values that are held by the filter unit 105 will hereinafter be referred to as the importance degree evaluation values $A^1_{1,n}$ to $A^{(T-1)}_{1,n}$.

The filter unit 105 obtains the largest value of the importance degree evaluation values $A^1_{1,n}$ to $A^{(T-1)}_{1,n}$ and the values of the current importance degree parameter $A^T_{1,n}$ as the largest importance degree parameter $A^{Ta}_{1,n}$. The largest importance degree parameter $A^{Ta}_{1,n}$ is used by the unit # ln and by the unit #(1+1)1 to the unit #(1+1)N at the time of backpropagation, which will be described later. Therefore, the largest importance degree parameter $A^{Ta}_{1,n}$ is output to the unit #(1+1)1 to the unit #(1+1)N.

Figure 4:
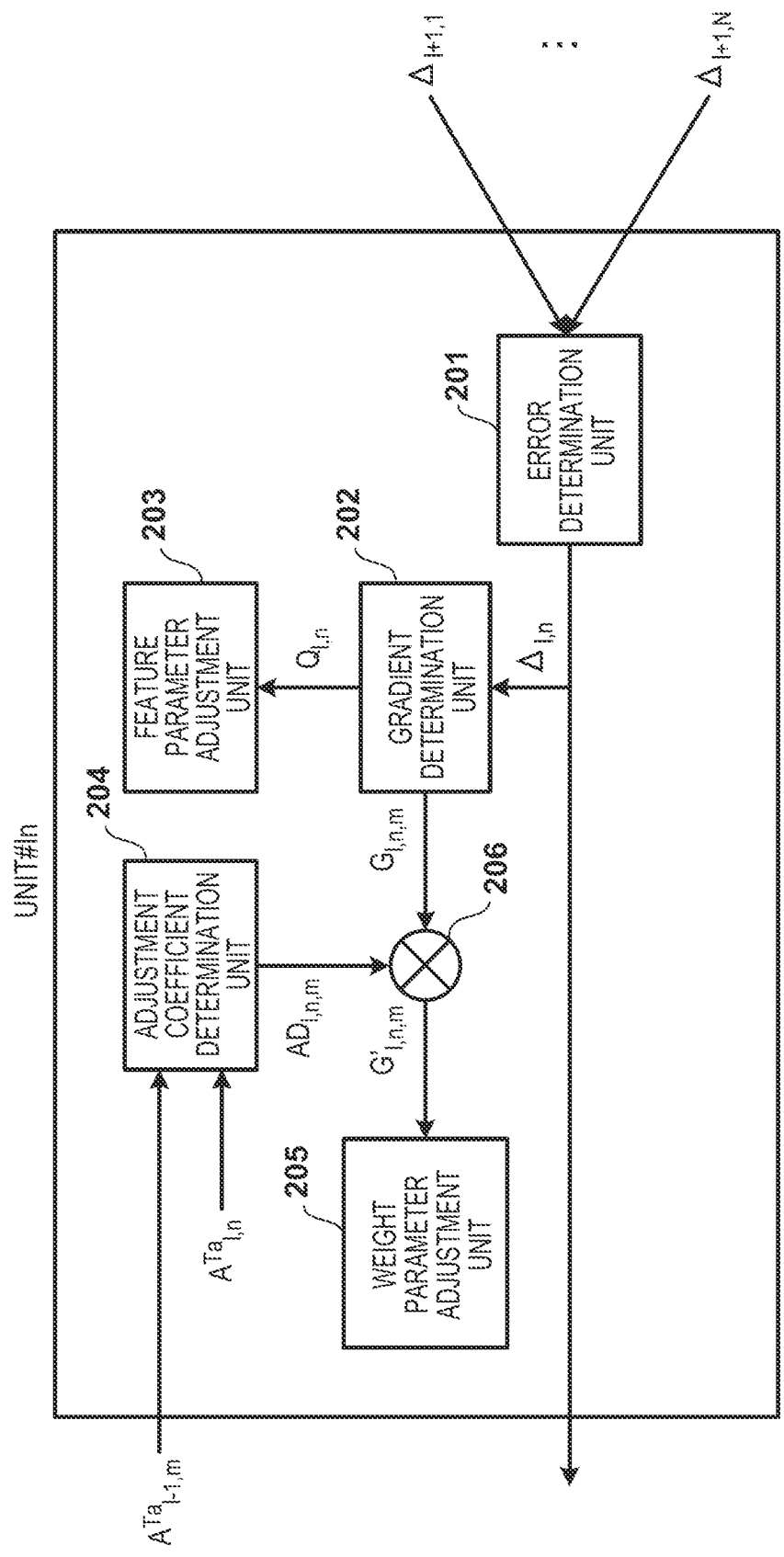
FIG. 4 is a functional block diagram of units in the dissimilar task determination processing at the time of backpropagation.

FIG. 4 is a functional block diagram for describing the operations of the unit # ln at the time of backpropagation. The unit #(1+1)1 to the unit #(1+1)N respectively input error amounts $\Delta_{l+1,1}$ to $\Delta_{l+1,N}$ to an error determination unit 201. Based on the input error amounts, the error determination unit 201 obtains an error amount $\Delta_{1,n}$ of the unit # ln. The error amount $\Delta_{1,n}$ of the unit # ln is output to the unit #(1-1)1 to the unit #(1-1)N. This processing is similar to processing according to a normal error backpropagation method.

A gradient determination unit 202 obtains a gradient $G_{1,n,m}$ of a weight parameter held by the neuron unit 101 based on the error amount $\Delta_{1,n}$ of the unit # ln. Note that the gradient $G_{1,n,m}$ is a gradient of a weight coefficient corresponding to the input value from the unit #(1-1)m, where m is an integer from 1 to N. Note that this processing, too, is similar to processing according to the normal error backpropagation method.

In the present embodiment, the gradient determination unit 202 also obtains a gradient $Q_{1,n}$ of the feature parameter $E^T_{1,n}$ in addition to the gradient $G_{1,n,m}$. A feature parameter adjustment unit 203 updates the feature parameter $E^T_{1,n}$ based on the gradient $Q_{1,n}$.

The largest importance degree parameter $A^{Ta}_{1,n}$ obtained by the filter unit 105, as well as the largest importance degree parameters $A^{Ta}_{1-1,1}$ to $A^{Ta}_{1-1,N}$ obtained by the filter units 105 of the unit #(1-1)1 to the unit #(1-1)N, is input to an adjustment coefficient determination unit 204. For example, in order to obtain an adjustment coefficient $AD_{1,n,m}$ of the gradient $G_{1,n,m}$, the adjustment coefficient determination unit 204 selects the smaller one of the values of the largest importance degree parameter $A^{Ta}_{1,n}$ and the largest importance degree parameter $A^{Ta}_{1-1,m}$ as a value X. Then, the adjustment coefficient determination unit 204 outputs a value obtained by subtracting the value X from 1, as the adjustment coefficient $AD_{1,n,m}$, to a multiplication unit 206. The multiplication unit 206 outputs the value of the product of the gradient $G_{1,n,m}$ and the adjustment coefficient $AD_{1,n,m}$, as an adjusted gradient $G'_{1,n,m}$, to a parameter adjustment unit 205. Based on the gradient $G'_{1,n,m}$, the parameter adjustment unit 205 updates the weight coefficient corresponding to the input value from the unit #(1-1)m.

In the normal error backpropagation method, the weight coefficient corresponding to the input value from the unit #(1-1)m is updated based on the gradient $G_{1,n,m}$; however, in the present embodiment, as stated earlier, the weight coefficient corresponding to the input value from the unit #(1-1)m is updated based on the adjusted gradient $G'_{1,n,m}$. Here, the largest importance degree parameter $A^{Ta}_{1,n}$ and the largest importance degree parameter $A^{Ta}_{1-1,m}$ both have a value of 0 to 1. Therefore, the adjustment coefficient $AD_{1,n,m}$ also has a value of 0 to 1, and the absolute value of the adjusted gradient $G'_{1,n,m}$ is smaller than the absolute value of the gradient $G_{1,n,m}$ before adjustment. Note that as the adjustment coefficient $AD_{1,n,m}$ decreases as the value X increases, the difference between the adjusted gradient $G'_{1,n,m}$ and the gradient $G_{1,n,m}$ before adjustment increases as the value X increases.

In the dissimilar task determination processing, the information processing apparatus repeatedly performs the above-described forward propagation and backpropagation using the learning set of the task T. Note that the number of repetitions can be a predetermined number. Alternatively, repetitions can be done until the values of losses or the feature parameters of respective units have converged.

The above-described repetitive processing is similar to processing according to the HAT technique. By repeatedly performing forward propagation and backpropagation, the importance degree parameter $A^T_{1,n}$ becomes close to 1 in units that are important to the task T, whereas the importance degree parameter $A^T_{1,n}$ becomes close to 0 in units that are not important to the task T. Therefore, when the unit # ln is important to the task T, the output value $H_{1,n}$ of the unit # ln is similar to the intermediate value $O_{1,n}$ output from the neuron unit 101. On the other hand, when the unit # ln is not important to the task T, the output value of the unit # ln is substantially 0, that is to say, blocked.

Also, when both of the unit # ln and the unit #(1-1)m are important to one of the task 1 to the task T−1, the absolute value of the adjusted gradient $G'_{1,n,m}$ becomes small. Therefore, updating of the weight coefficient corresponding to the input value from the unit #(1-1)m is suppressed.

The information processing apparatus records the feature parameter $E^T_{1,n}$ at the time of completion of the repetitions of forward propagation and backpropagation based on the learning set of the task T as a feature value $E^T_{1,n}$.

Therefore, the information processing apparatus has recorded the feature parameters $E^1_{1,n}$ to $E^{T-1}_{1,n}$ at the time of completion of the repetitions of forward propagation and backpropagation based on the learning sets of the tasks 1 to T−1 as feature values $E^1_{1,n}$ to $E^{T-1}_{1,n}$.

When both of the unit #(1-1)m and the unit # ln are important to the past tasks, the adjusted gradient $G'_{1,n,m}$ becomes small; as a result, the weight coefficient corresponding to the input value from the unit #(1-1)m is not easily updated. Therefore, with respect to such a unit, the feature parameter $E^T_{1,n}$ is mainly updated, and thus the feature parameter at the time of completion of the dissimilar task determination processing indicates the features of each task. Hence, in the present embodiment, a degree of similarity in layer behaviors among tasks is evaluated based on the feature parameters at the time of completion of the dissimilar task determination processing, that is to say, the feature values $E^1_{1,n}$ to $E^T_{1,n}$.

Thus, the information processing apparatus regards the feature values $E^T_{1,1}$ to $E^T_{1,n}$ of respective units in the same layer (the $1^{th}$ layer) as one feature vector $V^T_1$, and categorizes the feature vectors $V^1_1$ to $V^T_1$, which have been obtained respectively for the task 1 to the task T, into a plurality of clusters by way of clustering. Note that an arbitrary clustering technique, such as a K-means method and an X-means method, can be applied to clustering.

For example, as a non-limiting specific example, assume that the feature vector $V^T{}_1$ belongs to the same cluster as $V^1{}_1$, $V^5{}_1$, and $V^7{}_1$. In this case, the information processing apparatus determines that the behaviors of the $1^{th}$ layer in the task T is similar to the behaviors of the $1^{th}$ layer in each of the tasks 1, 5, and 7. The information processing apparatus also determines that the behaviors of the $1^{th}$ layer in the task T is not similar to the behaviors of the $1^{th}$ layer in the tasks which are included among the task 1 to the task T−1 and which are different from the tasks 1, 5, and 7. In the following description, the tasks with the behaviors that are not similar to the behaviors of the $1^{th}$ layer in the task T will be referred to as dissimilar tasks in the $1^{th}$ layer.

The dissimilar task determination processing in step S10 of FIG. 2 is ended upon determining the dissimilar tasks in each layer.

Next, in step S11, the information processing apparatus performs the parameter adjustment processing. Similarly to normal learning, the parameter adjustment processing, too, is repetitions of the obtainment of output values of the neural network with sequential inputting of data pieces of the learning set of the task T to the neural network (forward propagation), and updating of the parameters of each unit based on the output values of the neural network (backpropagation). Note that the number of repetitions can be a predetermined number, or repetitions can be done until it is determined that the weight parameters of each unit have converged.

Note that as stated earlier, initial parameters are used as parameters of each unit at the time of the start of the parameter adjustment processing. The configuration of each unit at the time of forward propagation in the parameter adjustment processing is similar to FIG. 3.

Figure 5:
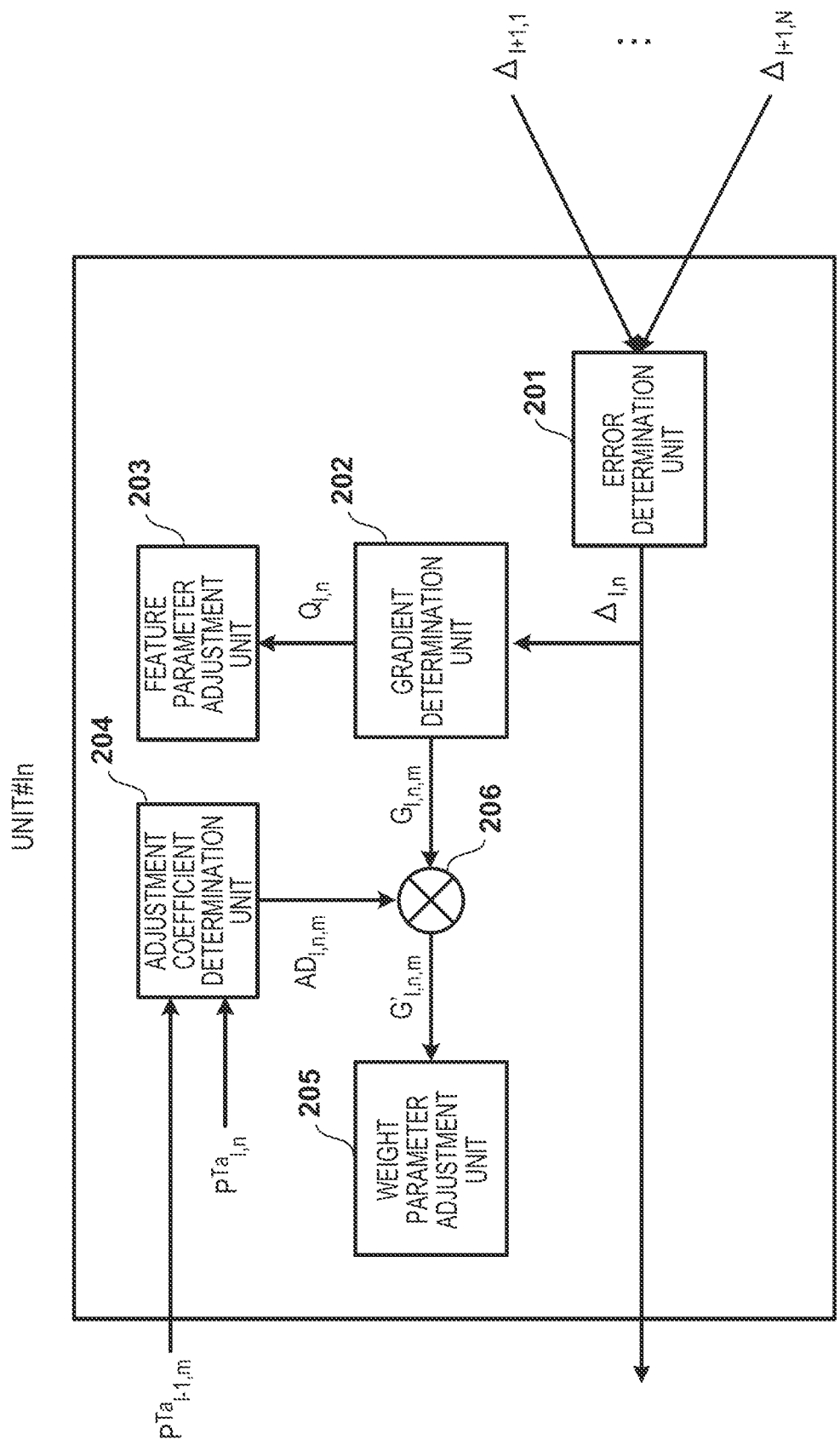
FIG. 5 is a functional block diagram of units in parameter adjustment processing at the time of backpropagation.

On the other hand, the configuration of each unit at the time of backpropagation is as shown in FIG. 5, rather than FIG. 4. That is to say, the largest importance degree parameters $A^{Ta}{}_{1,n}$ and $A^{Ta}{}_{1-1,m}$ are replaced with the largest importance degree parameters $P^{Ta}{}_{1,n}$ and $P^{Ta}{}_{1-1,m}$ as the inputs to the adjustment coefficient determination unit 204. The largest importance degree parameter $P^{Ta}{}_{1,n}$ is the largest value of the importance degree evaluation values related to the dissimilar tasks in the $1^{th}$ layer among the importance degree evaluation values $A^1{}_{1,n}$ to $A^{(T-1)}{}_{1,n}$. Assume that the dissimilar tasks in the $1^{th}$ layer are the tasks 1 to 5 as a specific example. In this case, the information processing apparatus uses the largest value of the importance degree evaluation values $A^1{}_{1,n}$ to $A^5{}_{1,n}$ as the largest importance degree parameter $P^{Ta}{}_{1,n}$.

In this way, updating of the weight coefficients that respectively correspond to the input values of each unit is suppressed based on the importance degree evaluation values of the dissimilar tasks in each layer. Note that the larger the importance degree evaluation values of respective dissimilar tasks in the $(1-1)^{th}$ layer and the $1^{th}$ layer, the higher the degree at which updating of the weight coefficients of the input values that are input from the units in the $(1-1)^{th}$ layer to the units in the $1^{th}$ layer is suppressed. Therefore, updating of weight coefficients that are important to the tasks that are not similar to the task T is suppressed, and the occurrence of catastrophic forgetting can be prevented. In contrast, weight coefficients that are mainly updated also include weight coefficients that are important to the tasks that are similar to the task T, and thus reuse of parameters, that is to say, transfer of knowledge can be facilitated.

Note that in the parameter adjustment processing, too, repetitions of forward propagation and backpropagation update the feature parameter value $E^T{}_{1,n}$ and accordingly, the importance degree parameter $A^T{}_{1,n}$ is updated. The information processing apparatus stores the value of the importance degree parameter $A^T{}_{1,n}$ at the time of completion of repetitions of forward propagation and backpropagation in the parameter adjustment processing as the importance degree evaluation value $A^T{}_{1,n}$ of the unit # ln in the task T. This value will be used in learning related to a task T+1.

Also, in the present embodiment, the similarity between the past tasks (task 1 to task T−1) and the task T is determined on a per-layer basis by way of clustering of the feature vectors $V^1{}_1$ to $V^T{}_1$. Therefore, the calculation cost can be lowered compared to the CAT technique, which determines the similarity among tasks by way of comparison with each individual one of the task 1 to the task T−1.

Figure 6:
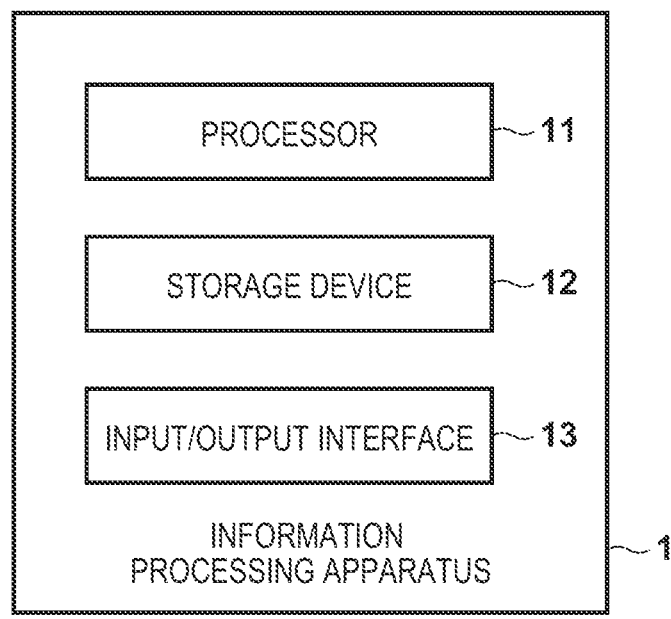
FIG. 6 is a diagram showing a hardware configuration of the information processing apparatus.

FIG. 6 is a hardware configuration diagram of an information processing apparatus 1 according to the present embodiment. The information processing apparatus 1 includes one or more processors 11, a storage device 12 that includes volatile and nonvolatile memories, and an input/output interface 13 which is a keyboard, a mouse, a display, or the like.

Figure 7:
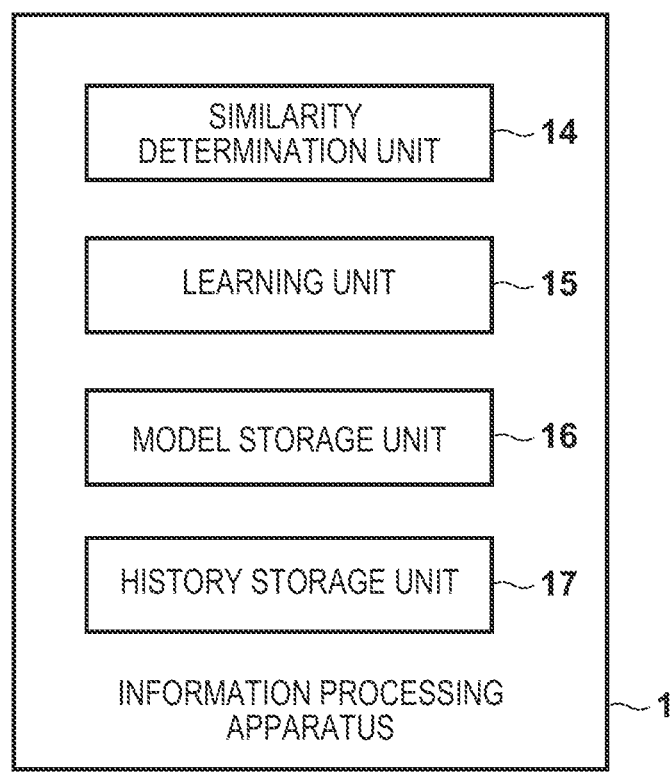
FIG. 7 is a functional block diagram of the information processing apparatus.

The function blocks shown in FIG. 7 are realized by one or more processors 11 executing a program stored in the storage device 12. A model storage unit 16 stores the parameters of each unit in the plurality of layers, and model information of the neural network, such as a connection relationship among respective units. A history storage unit 17 stores, for example, the feature values $E^1{}_{1,n}$ to $E^{T-1}{}_{1,n}$ and the importance degree evaluation values $A^1{}_{1,n}$ to $A^{(T-1)}{}_{1,n}$ before the task T is learned.

A similarity determination unit 14 executes the dissimilar task determination processing that has been described using step S10 of FIG. 2. A learning unit 15 executes the parameter adjustment processing that has been described using step S11 of FIG. 2.

Figure 8:
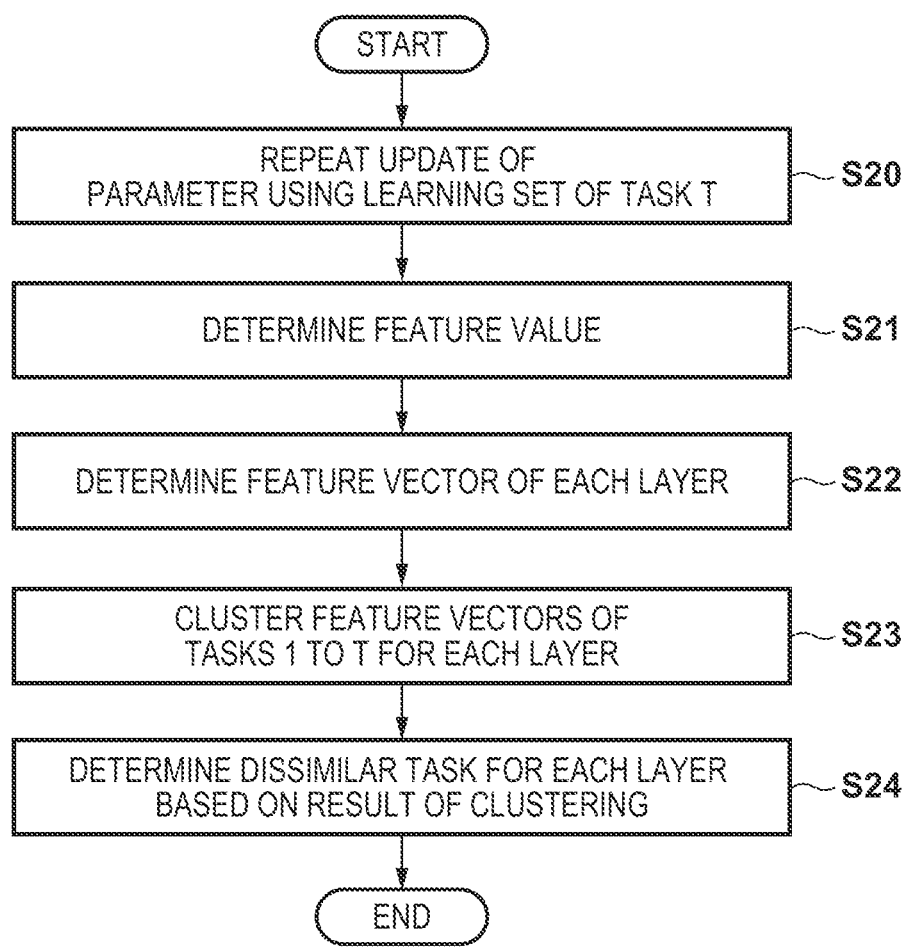
FIG. 8 is a flowchart of the dissimilar task determination processing.

FIG. 8 is a flowchart of the dissimilar task determination processing in step S10. In step S20, the similarity determination unit 14 updates the parameters of each unit using the learning set of the task T. The parameters include the feature parameter $E^T{}_{1,n}$. Updating is performed by using the learning set of the task T repeatedly. In step S21, the similarity determination unit 14 determines the value of the feature parameter $E^T{}_{1,n}$ at the time of completion of repetitive updating based on the learning set of the task T, and uses this value as the feature value $E^T{}_{1,n}$. In step S22, for each layer, the similarity determination unit 14 determines the feature vector $V^T{}_1$ from the feature value of each unit. In step S23, the similarity determination unit 14 places the feature vectors $V^1{}_1$ to $V^T{}_1$, which have been obtained respectively based on the learning sets of the first task to the $T^{th}$ task, into clusters. For each layer, the similarity determination unit 14 determines past tasks that are not similar to the task T based on the result of clustering in step S23.

Using the initial values of respective parameters, the learning unit 15 performs learning based on the learning set of the task T. Note that at this time, updating of the weight parameters is suppressed based on the importance degree evaluation values of the dissimilar tasks in each layer.

Note that a program that is caused to function as an information processing apparatus can be, for example, distributed in a state where it is stored in a non-transitory computer-readable storage medium.

According to a first aspect of the present disclosure, a method executed by an information processing apparatus in order to cause a neural network to learn a $T^{th}$ task corresponding to a $T^{th}$ learning set is provided. Here, the neural network has learned, in sequence, a first task to a $(T-1)^{th}$ task that respectively correspond to a first learning set to a $(T-1)^{th}$ learning set by using the first learning set to the $(T-1)^{th}$ learning set, where T is an integer equal to or larger than 2. The neural network includes a plurality of layers that each include a plurality of units, and each of the plurality of units including a weight parameter corresponding to an input value to the unit. According to the first aspect, the method includes: for each of the plurality of units included in the plurality of layers, determining an importance degree of the unit in the $T^{th}$ task; for each of the plurality of layers, determining dissimilar tasks from among the first task to the $(T-1)^{th}$ task, the dissimilar tasks being not similar to the $T^{th}$ task in terms of behaviors in the layer; and in learning that uses the $T^{th}$ learning set, suppressing updating of weight parameters of the plurality of units included in the plurality of layers in accordance with importance degrees in the dissimilar tasks that have been determined for each of the plurality of layers.

The weight parameter of a first unit included in a first layer included among the plurality of layers, may include a first weight coefficient corresponding to the input value that is input to the first unit from a second unit included in a second layer included among the plurality of layers, the suppressing may include updating the first weight coefficient based on a first value that is a smaller one of: a largest value of importance degrees of the dissimilar tasks in the first unit that have been determined with respect to the first layer; and a largest value of importance degrees of the dissimilar tasks in the second unit that have been determined with respect to the second layer, and the larger the first value, the higher a degree of suppression of updating of the first weight coefficient.

The suppressing may include: obtaining an error amount of the first unit, obtaining a first gradient of the first weight coefficient based on the error amount of the first unit, changing the first gradient to a second gradient based on the first value, and updating the first weight coefficient based on the second gradient, and an absolute value of the second gradient may be smaller than an absolute value of the first gradient.

Each of the plurality of units in the plurality of layers may include a feature parameter, and the determining of the dissimilar tasks may include repetitive processing that repeats the following step with respect to each of the plurality of units included in the plurality of layers: (1) in order to obtain an output of the neural network based on the $T^{th}$ learning set, obtaining an output value of the unit based on the input value to the unit and on the weight parameter and the feature parameter of the unit; (2) obtaining an error amount of the unit based on the output of the neural network based on the $T^{th}$ learning set; (3) obtaining a third gradient of the feature parameter based on the error amount of the unit; and (4) updating the feature parameter based on the third gradient of the feature parameter.

The determining of the dissimilar tasks may include after the repetitive processing has been completed using the $T^{th}$ learning set, obtaining, for each of the plurality of layers, feature vectors that use the feature parameters of the plurality of units included in the layer as elements, and for each of the plurality of layers, clustering the feature vectors of the first task to the $T^{th}$ task, and the dissimilar tasks related to each of the plurality of layers are determined based on a result of the clustering.

The dissimilar tasks related to the layer may be tasks which are included among the first task to the $(T-1)^{th}$ task, and which correspond to the feature vectors that have been categorized into clusters different from a cluster of the feature vector of the $T^{th}$ task.

The obtaining of the output value of the unit may include obtaining an intermediate value based on the input value to the unit and the weight parameter, using a function, converting a value based on the feature parameter into an importance degree parameter in a range of 0 to 1, and multiplying the intermediate value by the importance degree parameter in order to obtain the output value of the unit.

The importance degree of the unit may be determined based on a value of the importance degree parameter.

The importance degree of the unit may increase as the value of the importance degree parameter increases.

The function may be a sigmoid function.

The importance degree parameter may be a value obtained by converting a third value using the sigmoid function, the third value being obtained by multiplying the feature parameter by a second value.

The weight parameter of a first unit included in a first layer included among the plurality of layers, may include a first weight coefficient corresponding to the input value that is input to the first unit from a second unit included in a second layer included among the plurality of layers. The repetitive processing may include: determining a first largest value of the importance degree parameter of the first unit and the importance degrees of the first unit in the first task to the $(T-1)$th task, determining a fourth gradient of the first weight coefficient based on the error amount of the unit, obtaining, from the second unit, a second largest value of the importance degree parameter of the second unit and the importance degrees of the second unit in the first task to the $(T-1)^{th}$ task, changing the fourth gradient to a fifth gradient based on a fourth value that is the smaller one of the first largest value and the second largest value, and updating the first weight coefficient based on the fifth gradient. The absolute value of the fifth gradient may be smaller than an absolute value of the fourth gradient.

The difference between the fifth gradient and the fourth gradient may increase as the fourth value increases.

According to a second aspect of the present disclosure, an information processing apparatus including: one or more processors; and a storage device that stores a program that is executable by the one or more processors is provided.

The information apparatus, when the program is executed on the one or more processors, performs the method according to the first aspect.

According to a third aspect of the present disclosure, a non-transitory computer-readable storage medium that stores a program is provided. The program, when executed on one or more processors of a device, causes the device to perform the method according to the first aspect.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method executed by an information processing apparatus in order to cause a neural network to learn a $T^{th}$ task corresponding to a $T^{th}$ learning set, the neural network having learned, in sequence, a first task to a $(T-1)^{th}$ task that respectively correspond to a first learning set to a $(T-1)^{th}$ learning set by using the first learning set to the $(T-1)^{th}$ learning set, where T is an integer equal to or larger than 2,
the neural network including a plurality of layers that each include a plurality of units,
each of the plurality of units including a weight parameter corresponding to an input value to the unit,
the method comprising:
for each of the plurality of units included in the plurality of layers, determining an importance degree of the unit in the $T^{th}$ task;
for each of the plurality of layers, determining dissimilar tasks from among the first task to the $(T-1)^{th}$ task, the dissimilar tasks being not similar to the $T^{th}$ task in terms of behaviors in the layer; and
in learning that uses the $T^{th}$ learning set, suppressing updating of weight parameters of the plurality of units included in the plurality of layers in accordance with importance degrees in the dissimilar tasks that have been determined for each of the plurality of layers.

2. The method according to claim 1, wherein
the weight parameter of a first unit included in a first layer included among the plurality of layers, includes a first weight coefficient corresponding to the input value that is input to the first unit from a second unit included in a second layer included among the plurality of layers,
the suppressing includes updating the first weight coefficient based on a first value that is a smaller one of: a largest value of importance degrees of the dissimilar tasks in the first unit that have been determined with respect to the first layer; and a largest value of importance degrees of the dissimilar tasks in the second unit that have been determined with respect to the second layer, and
the larger the first value, the higher a degree of suppression of updating of the first weight coefficient.

3. The method according to claim 2, wherein
the suppressing includes
obtaining an error amount of the first unit,
obtaining a first gradient of the first weight coefficient based on the error amount of the first unit,
changing the first gradient to a second gradient based on the first value, and
updating the first weight coefficient based on the second gradient, and
an absolute value of the second gradient is smaller than an absolute value of the first gradient.

4. The method according to claim 1, wherein
each of the plurality of units in the plurality of layers includes a feature parameter, and
the determining of the dissimilar tasks includes repetitive processing that repeats following with respect to each of the plurality of units included in the plurality of layers:
in order to obtain an output of the neural network based on the $T^{th}$ learning set, obtaining an output value of the unit based on the input value to the unit and on the weight parameter and the feature parameter of the unit;
obtaining an error amount of the unit based on the output of the neural network based on the $T^{th}$ learning set;
obtaining a third gradient of the feature parameter based on the error amount of the unit; and
updating the feature parameter based on the third gradient of the feature parameter.

5. The method according to claim 4, wherein
the determining of the dissimilar tasks includes
after the repetitive processing has been completed using the $T^{th}$ learning set, obtaining, for each of the plurality of layers, feature vectors that use the feature parameters of the plurality of units included in the layer as elements, and
for each of the plurality of layers, clustering the feature vectors of the first task to the $T^{th}$ task, and
the dissimilar tasks related to each of the plurality of layers are determined based on a result of the clustering.

6. The method according to claim 5, wherein
the dissimilar tasks related to the layer are tasks which are included among the first task to the $(T-1)^{th}$ task, and which correspond to the feature vectors that have been categorized into clusters different from a cluster of the feature vector of the $T^{th}$ task.

7. The method according to claim 4, wherein
the obtaining of the output value of the unit includes
obtaining an intermediate value based on the input value to the unit and the weight parameter,
using a function, converting a value based on the feature parameter into an importance degree parameter in a range of 0 to 1, and
multiplying the intermediate value by the importance degree parameter in order to obtain the output value of the unit.

8. The method according to claim 7, wherein
the importance degree of the unit is determined based on a value of the importance degree parameter.

9. The method according to claim 8, wherein
the importance degree of the unit increases as the value of the importance degree parameter increases.

10. The method according to claim 7, wherein
the function is a sigmoid function.

11. The method according to claim 10, wherein
the importance degree parameter is a value obtained by converting a third value using the sigmoid function, the third value being obtained by multiplying the feature parameter by a second value.

12. The method according to claim 7, wherein
the weight parameter of a first unit included in a first layer included among the plurality of layers, includes a first weight coefficient corresponding to the input value that is input to the first unit from a second unit included in a second layer included among the plurality of layers,
the repetitive processing includes
determining a first largest value of the importance degree parameter of the first unit and the importance degrees of the first unit in the first task to the $(T-1)^{th}$ task,
determining a fourth gradient of the first weight coefficient based on the error amount of the unit,
obtaining, from the second unit, a second largest value of the importance degree parameter of the second unit and the importance degrees of the second unit in the first task to the $(T-1)^{th}$ task,
changing the fourth gradient to a fifth gradient based on a fourth value that is the smaller one of the first largest value and the second largest value, and
updating the first weight coefficient based on the fifth gradient, and
an absolute value of the fifth gradient is smaller than an absolute value of the fourth gradient.

13. The method according to claim 12, wherein
a difference between the fifth gradient and the fourth gradient increases as the fourth value increases.

14. An information processing apparatus, comprising:
one or more processors; and
a storage device that stores a program that is executable by the one or more processors, wherein
the storage device further stores weight parameters that respectively correspond to a plurality of units included in each of a plurality of layers of a neural network that have learned, in sequence, a first task to a $(T-1)^{th}$ task that respectively correspond to a first learning set to a $(T-1)^{th}$ learning set by using the first learning set to the $(T-1)^{th}$ learning set, where T is an integer equal to or larger than 2, by executing the program, the one or more processors cause the information processing apparatus to execute learning processing that causes the neural network to learn a $T^{th}$ task corresponding to a $T^{th}$ learning set using the $T^{th}$ learning set, and the learning processing includes for each of the plurality of units included in the plurality of layers, determining an importance degree of the unit in the $T^{th}$ task, for each of the plurality of layers, determining dissimilar tasks from among the first task to the $(T-1)^{th}$ task, the dissimilar tasks being not similar to the $T^{th}$ task in terms of behaviors in the layer, and in learning that uses the $T^{th}$ learning set, suppressing updating of the weight parameters of the plurality of units included in the plurality of layers in accordance with importance degrees of the dissimilar tasks that have been determined for each of the plurality of layers.

15. A non-transitory computer-readable storage medium that stores a program, wherein
when executed by one or more processors of an information processing apparatus, the program causes the information processing apparatus to execute learning processing that causes a neural network to learn a task corresponding to a learning set, the neural network including a plurality of layers that each include a plurality of units including weight parameters, and in causing the neural network to learn a $T^{th}$ task corresponding to a $T^{th}$ learning set after the neural network has learned, in sequence, a first task to a $(T-1)^{th}$ task that respectively correspond to a first learning set to a $(T-1)^{th}$ learning set, where T is an integer equal to or larger than 2, the learning processing includes for each of the plurality of units in the plurality of layers, determining an importance degree of the unit in the $T^{th}$ task, for each of the plurality of layers, determining dissimilar tasks from among the first task to the $(T-1)^{th}$ task, the dissimilar tasks being not similar to the $T^{th}$ task in terms of behaviors in the layer, and in learning that uses the $T^{th}$ learning set, suppressing updating of the weight parameters of the plurality of units included in the plurality of layers in accordance with importance degrees of the dissimilar tasks that have been determined for each of the plurality of layers.

* * * * *